June 23, 1970 — J. MIZUK — 3,516,573
PIE PAN
Filed June 21, 1967
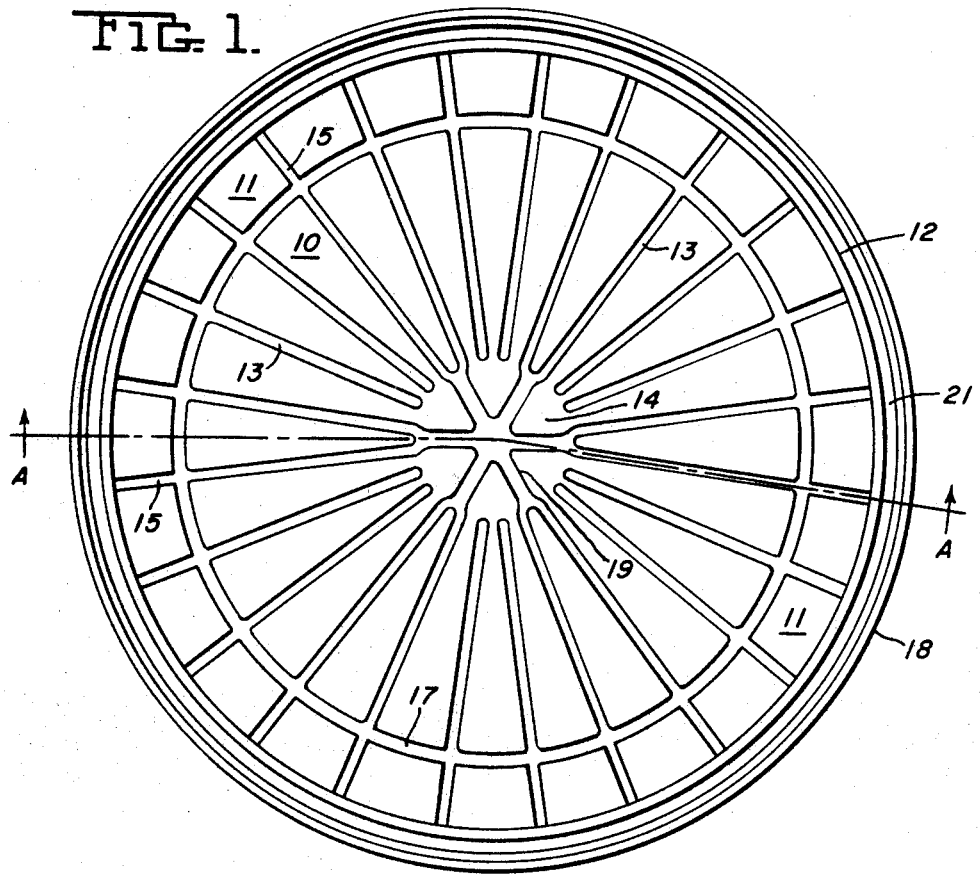
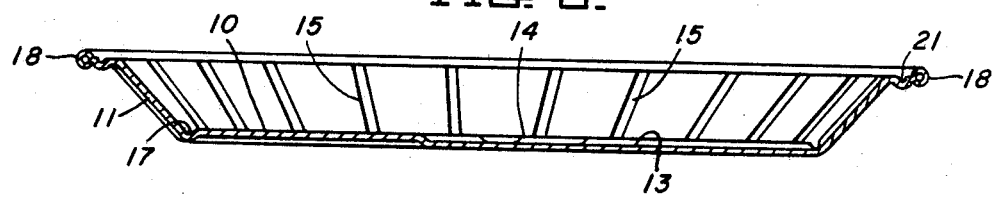
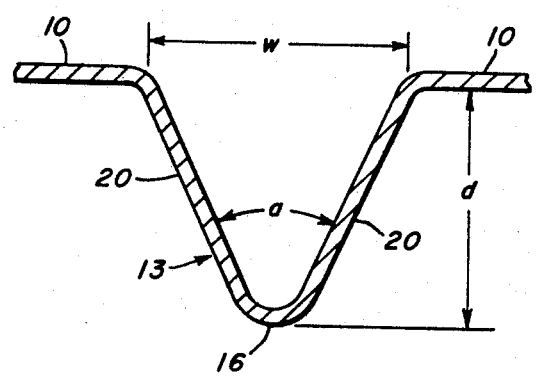
INVENTOR.
JOHN MIZUK
By Robert T. Teeter
Attorney United States Patent Office 3,516,573
Patented June 23, 1970

3,516,573
PIE PAN
John Mizuk, New Kensington, Pa., assignor to Aluminum Company of America, Pittsburgh, Pa., a corporation of Pennsylvania
Filed June 21, 1967, Ser. No. 647,791
Int. Cl. B65d 7/42
U.S. Cl. 220—72                                    4 Claims

ABSTRACT OF THE DISCLOSURE

A pie pan is provided having a plurality of downwardly embossed V-shaped grooves extending outwardly from the center area of the pan bottom and communicating with a plurality of striae extending upwardly throughout the height of the sidewall.

BACKGROUND OF THE INVENTION

This invention relates to a pan adapted for baking pies. More specifically, the invention relates to baking pans made of thin sheet metal and having downwardly embossed grooves extending outwardly from the center area to the perimeter of the bottom of the pan.

Pastry bakers and housewives have been chronically troubled by the tendency of pies to bake non-uniformly. When pies are baked in the heretofore known pie pans, most of the pie will be done and the top crust will be brown before the bottom crust is fully baked. The bottom crust tends to be soggy having areas of underbaked pie crust. This places the housewife or baker in the dilemma of either having to be satisfied with a pie having a soggy bottom crust, or having to continue baking to brown the bottom crust at the risk of overcooking the pie filling or burning the top crust. This problem is particularly experienced with frozen pies, especially those that are not pre-cooked prior to freezing. The moisture in these pies collects into ice crystals which, when thawed, create localized areas of high moisture content. It is believed that this excess moisture impedes the baking of the dough in the bottom of the pan to produce the light and flaky crust which is desired.

SUMMARY OF THE INVENTION

I have discovered that by providing a standard pan with passageways or vents for the excess moisture to escape in the form of vapor, pies baked in the pan will be more evenly baked.

An object of this invention is to provide an improved pan in which pies can be uniformly baked so that both the top and bottom crusts will be light and flaky.

Another object of this invention is to provide a pan in which pies can be baked more quickly than in the heretofore known pie pans.

A further object of the invention is to provide a pan adapted for baking pies wherein the moisture in the bottom crust can escape.

Another object of this invention is to provide a pan for baking pies wherein the baking heat will be distributed evenly throughout the bottom of the pie.

Another object of the invention is to provide a combination container and baking pan for storing and baking pies.

A further object of this invention is to provide an inexpensive container made of aluminum foil in which pies can be packaged and frozen for storing, marketing and subsequent baking.

These and various other objects and purposes of the invention will become more apparent in the following description and accompanying drawings in which:

BRIEF DESCRIPTION OF THE DRAWINGS

FIG. 1 is a plan view of a preferred embodiment of the invention;

FIG. 2 is a vertical sectional view of the pan in FIG. 1 along line A—A; and

FIG. 3 is an enlarged transverse sectional view through one of the grooves of the pan in FIG. 1.

DESCRIPTION OF PREFERRED EMBODIMENT

Before describing the invention, it is first noted that, while there is no single method for making and baking pies and no standard pie dough consistency, the invention and the discussion herein refers to the usual range of baking practices.

Referring to FIG. 1, it is seen that a typical pie pan made of sheet metal, cellulose material, glass or the like may have a bottom 10, an integral upwardly directed side wall 11 around the bottom 10, and an integral outwardly extending flange 12 around the upper edge of the sidewall 11 terminating in a bead 18. Such a pan is improved, according to this invention, by providing a plurality of downwardly embossed substantially V-shaped grooves 13 in the bottom 10 of the pan in combination wtih a plurality of striae 15 extending upwardly throughout the height of the side wall 11. The grooves 13 extend outwardly from the center area 14 to the perimeter of the pan bottom so as to communicate with the striae 15. In other words, the grooves 13 and striae 15 provide the continuous channels from the bottom to the top of the sidewall 11.

In the preferred embodiment of this invention, a V-shaped groove 17 communicating with grooves 13 and striae 15 is also disposed around the perimeter of the pan bottom 10, where it joins the sidewall 11. A downwardly embossed groove 2 is also provided in the flange 12 around the pan. Additional substantially V-shaped grooves 19 may also optionally be downwardly embossed in the center area 14 of the pan. The grooves 19 in the center area need not be aligned with grooves 13 but may communicate with grooves 13 through their contiguous ends.

It will be understood by one skilled in the art that, while the drawing depicts a round pan, this invention is also applicable to square, rectangular, and oval pans, among others. Moreover, while the grooves 13 are shown as radiating outwardly from the center area 14 of the bottom 10 of round pans, the grooves in a square or even a round pan might extend continuously across the bottom.

It is believed that grooves 13, grooves 17 if provided, and striae 15 serve at least two functions in improving the quality of pies baked in pans constructed in accordance with this invention. First, these grooves and striae provide escape passageways or vents for gases, particularly steam, evolved during the baking process. The grooves collect the gases and provide passageways to the sidewall 11 and the striae 15 provide passageways up the sidewall 11. Second, the grooves on the pan bottom reduce the occurrence of hot spots in the bottom of the pie. When a flat bottom pan sets on a hot hearth or shelf in an oven, not all the pan bottom will weigh evenly on the hearth. Consequently, the areas that weigh heaviest will conduct more heat and will therefore produce hot spots in the bottom of the pie. On the other hand, in a pan made in accordance with this invention, the grooves will have linear contact with the shelf and will conduct directly only a minimum of the heat from the shelf to the pie, and in doing so will distribute this heat evenly. The pie will for all practical purposes be heated by radiant heat.

Among the distinguishing features of the grooves in a pan made in accordance with this invention are that they are downwardly embossed, substantially V-shaped and communicate with the striae 15 or other means for gases to escape up the sidewall 11 and to the outside. Heretofore, some pie pans have had grooves in the bottom, but these grooves were customarily arcuate, semi-circular, or U-shaped rather than V-shaped. When the grooves are embossed downwardly and are substantially V-shaped, as in this invention, the raw dough will not sag into them and a small air space will remain at the bottom of the groove. It is this air space that provides a passageway for the gases evolved in baking to move across the bottom of the pan to the sidewall 11, and then up the striae 15 to exhaust into the atmosphere. The conventional arcuate or U-shaped groove does not provide such an escape passageway because the raw dough will sag into the grooves so as to substantially fill the same.

Referring to FIG. 3, it is seen that each groove 13 is slightly rounded at its bottom or apex 16 and at the junctures of the sides 20 with the flat bottom 10 of the pan. The groove, however, is for all practical purposes in the shape of a V. Rounding at the points indicated is merely a practical means for reducing stress concentrations that would cause splitting or cracking of the pan material.

As for the dimensions of the V, extensive experimentation has established that the included angle $a$ between the sides 20 of the groove should be no less than 25° and no more than 135°. If the angle $a$ is greater than 135°, the weight of the dough and the pie filling is likely to cause the dough in the bottom crust to sag completely into the groove and fill it. When this happens, the escape passageway for the gases evolved during baking will be closed and the bottom crust will not bake properly. When the angle $a$ is less than 25°, the groove will be too narrow to be an effective vent passage unless made impractically deep. As for the depth and width of the V-shaped groove, experimentation has revealed that a depth $d$ of between 0.035 inch and 0.092 inch, and a width $w$ at the mouth of between 0.25 and 0.0625 inch produce optimum results.

As for the striae 15, they need not be V-shaped since the force of the dough and filling is much less against the sides of the pan than against the pan bottom, and the pie dough will therefore not sag in these striae and fill them. Consequently, they can take the form of arcuate or U-shaped groove-like extensions of grooves 13 as in the preferred embodiment shown in the drawing, or may simply consist of the multiple corrugations or wrinkles that will naturally occur in forming a pan from sheet metal or foil.

Turning to the location and number of grooves 13, two factors are of particular importance. First, the grooves 13 in conjunction with the striae 15 must provide continuous passageways to the outside atmosphere, or close enough thereto, for the gases evolved during baking to be able to force their way to the atmosphere. It has been found that once the gases reach the top of the sidewall 11, they can force their way between the crust and the flange 12 around the pan to exhaust into the atmosphere. Furthermore, the flange 12 will usually be somewhat wrinkled during forming and these wrinkles will provide escape routes for the gases.

The second factor in determining the number of grooves is that all points in the bottom 10 of the pan should be sufficiently close to a groove 13 for the moisture and gases from that point to move to the groove. If there is a considerable distance between grooves, the dough between the grooves will not be well ventilated. In practice, it has been found that a typical eight to ten inch diameter pan may have anywhere from eight to thirty-six grooves or more, and that these grooves must extend at least to the perimeter of the bottom 10.

It is noted that the grooves 13 may also be given angled or devious paths across the pan bottom and thus present a variety of other designs in addition to the sunburst design shown in FIG. 1. In fact, pans having angled groove designs have the advantage of being less susceptible to bending along the groove lines or stress lines as compared to pans having straight line grooves.

Turning to the grooves 19 in the center of the pan, these grooves 19 draw up in this area some of the excess of sheet material from which the pan is formed. Additionally, these grooves 19 may provide venting in the center of the pan.

As shown in FIG. 1, the grooves 19 in the center of the pan are in non-alignment with the grooves 13 in the remainder of the pan bottom so as to interrupt straight line weakening across the pan. Grooves 19 and grooves 13 may communicate as shown to insure venting from the center area 14, or their ends may simply be adjacent. It has been found that with normal forming methods, the foil material between the adjacent ends of the grooves 13 and 19 will naturally be slightly depressed to provide continuous passageways for the gases to escape from the center area 14 to the grooves 13 and then to the atmosphere.

As mentioned above, in the preferred embodiment a peripheral V-shaped groove is located at the juncture of the bottom 10 and the sidewall 11. Unless a groove is located here, the grooves 13 will, with normal forming methods, tend to flatten out somewhat as they near the sidewall 11. When a pie is baked in a pan in which some of the grooves are flattened, the pie dough will tend to fill the flattened portions of the grooves 13 and thus impede passage of the evolving gases. A groove 17 around the periphery of the bottom will minimize this tendency of the other grooves 13 to flatten, and will interconnect all the grooves 13 with the striae 15. Escape of the gases up the sidewalls 11 of the pan is therefore more assured if groove 17 is provided.

The preferred embodiment of this invention may also have a downwardly embossed groove 21 in the flange 12 around the top of the pan. This groove 21 provides an insulating air space under the pie dough that is baked thereover and tends to retard or slow the baking of the crust in this area to a rate more closely approximating the rate of baking of the remainder of the pie and crust. In the absence of this groove 21, the crust over the flange 12 will tend to bake rapidly since it is relatively exposed to the oven heat, and will frequently burn before the remainder of the pie is completely baked. Inasmuch as the weight of the dough over the flange 12 will normally not be great enough to cause sagging of the dough into the groove 21, the groove 21 may be of any convenient configuration such as arcuate or U-shaped. The flange groove 21 also strengthens the pan as does the bead 18 around the periphery of the flange 12.

It has been observed that in addition to producing a more uniformly baked pie, this invention also shortens the required baking time for pies. It is believed that this is because the grooves distribute the heat more evenly over the bottom of the pie, and that the removal of the moisture through the escaping gases permits the crust to bake faster. Regardless of the reason for the faster baking, typical embodiments of the invention reduce the average required baking time for pies by approximately 10 percent.

TEST RESULTS

An extensive series of baking tests were run in which a first group of frozen pies was baked in pans made from aluminum foil in the range of 0.003 to 0.006 inch in thickness and having venting grooves made in accordance with this invention and a second group of froze pies was baked in identical pans except for the absence of venting grooves. In each test, a frozen pie from each group was baked simultaneously in the same oven. For these tests, the baking times and baking temperatures were varied to study the effects on the finished product, and to determine optimum controls. Additionally, some of the pies were baked starting from the frozen condition, and some were allowed to thaw before baking. Thermocouples were used to record the temperature of the bottom crust as the pies baked.

A taste panel that judged the pies baked in these tests found that the pies baked in the pans constructed in accordance with this invention tasted better, and that both the top and bottom crusts were evenly browned. Examination of the pies also revealed that the bottom crusts in the pies baked in pans with ventilation grooves were uniformly browned, whereas all the others had areas on the bottom crust that were noticeably either overcooked or undercooked. It was further recorded that in almost every test the temperature of the bottom crust during baking was lower in the pies baked in the pans having ventilation grooves. It is believed that this lower temperature results because the grooves act to distribute the heat more evenly, and that the escape of the hot gases carry off some of the heat from the bottom of the pie.

In tests with fresh pies and with frozen pies that were allowed to thaw prior to baking, the optimum baking time was also cut to approximately ninety percent of the required baking time for fresh or thawed pies in non-ventilated type pans.

What is claimed is:

1. A pan adapted for baking pies, said pan having a bottom, an integral upwardly directed sidewall around said bottom and an outwardly extending flange around the top periphery of the sidewall, wherein the improvement comprises a plurality of striae extending upwardly throughout the height of said sidewall, and a plurality of substantially V-shaped grooves downwardly embossed in said bottom and extending outwardly from the center area to the perimeter of said bottom, said V-shaped grooves having planar walls with the included angle therebetween being no less than 25° and no greater than 135° and meeting at a rounded groove bottom having a minimum bend radius for the material of the pan, said pan further having a groove downwardly embossed around the perimeter of said pan bottom where it joins said sidewall and communicating with said V-shaped grooves and said striae.

2. A pan as in claim 1 wherein said V-shaped grooves are between 0.25 and 0.0625 inch in width across the mouth thereof and between 0.092 and 0.035 inch in depth.

3. A pan as in claim 1 which is made of aluminum foil between 0.003 and 0.006 inch in thickness.

4. A pan as in claim 1 wherein a groove is downwardly embossed in said flange around said pan.

References Cited

UNITED STATES PATENTS

| | | | |
|---|---|---|---|
| 476,340 | 6/1892 | Wagandt. | |
| 2,802,411 | 8/1957 | Riener | 220—72 X |
| 2,924,369 | 2/1960 | Richter. | |
| 2,938,649 | 5/1960 | Debs | 220—72 |
| 3,101,864 | 8/1963 | Glickman | 220—72 X |
| 3,179,036 | 4/1965 | Luker | 220—72 X |
| 3,351,265 | 11/1967 | Miller | 220—72 X |

JOSEPH R. LECLAIR, Primary Examiner

J. R. GARRETT, Assistant Examiner